United States Patent
Guo

(10) Patent No.: US 9,084,159 B2
(45) Date of Patent: *Jul. 14, 2015

(54) METHOD AND APPARATUS FOR ACCESSING LEGACY NETWORKS THROUGH TEMPORARY ID OF EVOLVED NETWORK

(71) Applicant: Huawei Technologies Co., LTD., Shenzhen (CN)

(72) Inventor: Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

This patent is subject to a terminal disclaimer.

(21) Appl. No.: 13/915,457

(22) Filed: Jun. 11, 2013

(65) Prior Publication Data

US 2014/0051448 A1    Feb. 20, 2014

Related U.S. Application Data

(63) Continuation of application No. 13/314,612, filed on Dec. 8, 2011, now Pat. No. 8,483,166, which is a continuation of application No. 12/649,942, filed on Dec. 30, 2009, now abandoned, which is a continuation of application No. PCT/CN2008/072864, filed on Oct. 28, 2008.

(30) Foreign Application Priority Data

Nov. 1, 2007   (CN) .......................... 2007 1 0166066
Apr. 11, 2008  (CN) .......................... 2008 1 0091433

(51) Int. Cl.
H04W 36/00    (2009.01)
H04W 8/26     (2009.01)
H04W 88/14    (2009.01)

(52) U.S. Cl.
CPC ............ *H04W 36/0033* (2013.01); *H04W 8/26* (2013.01); *H04W 88/14* (2013.01)

(58) Field of Classification Search
CPC ........................... H04W 36/0033; H04W 8/26
See application file for complete search history.

(56) References Cited

U.S. PATENT DOCUMENTS 6,408,182 B1   6/2002  Davidson et al.
7,054,629 B2   5/2006  Turina et al.
(Continued)

FOREIGN PATENT DOCUMENTS

CN    1968534 A      5/2007
CN    101047960 A    10/2007
(Continued)

OTHER PUBLICATIONS

3rd Generation Partnership Project; Technical Specification Group Service and System Aspects; GPRS enhancements for E-UTRAN access (Release 8), 3GPP TS 23.401 V1.3.0, Oct. 2007, 136 pages.
(Continued)

*Primary Examiner* — Jianye Wu
(74) *Attorney, Agent, or Firm* — Slater & Matsil, L.L.P.

(57) ABSTRACT

In a method for accessing a legacy wireless network, a radio access network (RAN) node in the legacy wireless network receives an access message sent by a User Equipment (UE) attempting to access the legacy wireless network. The access message includes mobility management entity (MME) information identifying an MME accessed by the UE in an evolved network. The MME information is added by the UE from a temporary identity (ID) allocated by the MME to a first P-Temporary Mobile Station Identity (P-TMSI) in the access message. The RAN node selects a corresponding Serving GPRS Support Node (SGSN) in the legacy wireless network for the UE according to the first P-TMSI in the access message.

20 Claims, 11 Drawing Sheets

(56) References Cited

U.S. PATENT DOCUMENTS

| | | | |
|---|---|---|---|
| 2006/0089146 A1 | 4/2006 | Gazzard | |
| 2007/0117575 A1 | 5/2007 | Courau et al. | |
| 2007/0293249 A1 | 12/2007 | Wang | |
| 2008/0184032 A1 | 7/2008 | Li et al. | |
| 2008/0233947 A1 | 9/2008 | Herrero-Veron | |
| 2008/0268842 A1 | 10/2008 | Herrero-Veron | |
| 2009/0176496 A1* | 7/2009 | Li et al. | 455/437 |
| 2009/0213762 A1* | 8/2009 | Guo et al. | 370/254 |
| 2010/0246533 A1* | 9/2010 | Lundin et al. | 370/332 |

FOREIGN PATENT DOCUMENTS

| | | |
|---|---|---|
| EP | 2161963 A1 | 3/2010 |
| WO | 2007115873 A1 | 10/2007 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.2.0, Sep. 2007, 109 pages.
China Mobile et al., "Discussion on the structure of S-TMSI," 3GPP TSG SA WG2 Meeting #59, S2-073255, Helsinki, Finland, Aug. 27-31, 2007, 4 pages.
Extended European Search Report received in Application No. 12181683.9-2413 mailed Oct. 19, 2012, 6 pages.
Extended European Search Report received in Application No. 08844321.3-2413 Jul. 20, 2010, 8 pages.
European Office Action received in Application No. 08 844 321.3-2413 mailed Oct. 24, 2011, 6 pages.
Ericsson "SAE/ LTE Identities," 3GPP TSG-RAN WG3 #53, Tdoc R3-061194, Tallinn, Estonia, Aug. 28-Sep. 1, 2006, 4 pages.
Ericsson, "On need for Serving SAE GW TMSI (formerly called UPE TMSI)," 3GPP TSG SA WG2 Architecture—S2#57 Rel-8 Ad-hoc, S2-071211, Warsaw, Poland, Mar. 26-30, 2007, 2 pages.
Huawei, "S-TMSI interworking with legacy network," 3GPP TSG SA WG2 Meeting #61, S2-075024, Ljublijana, Slovenia, Nov. 12-16, 2007, 4 pages.
International Search Report and Written Opinion received in Application No. PCT/CN2008/072864 mailed Jan. 8, 2009, 10 pages.
Japanese Office Action received Application No. 2010-521290 mailed Jan. 31, 2012, 5 pages.
Mitsubishi Electric, "Virtual Location Areas for inter access system mobility in idle mode," 3GPP TSG RAN WG3 Meeting #51bis, R3-060491, Sophia-Antipolis, France, Apr. 3-5, 2006, 5 pages.
Nokia Siemens Networks, et al., "RAU procedure MME/SGW to pre-Rel-8 SGSN," 3GPP TSG SA WG2 Architecture—S2#58, S2-072750, Orlando, Florida, Jun. 25-29, 2007, 6 pages.
United States Office Action received in U.S. Appl. No. 12/649,942, mailed Jan. 23, 2012, 17 pages.
United States Office Action received in U.S. Appl. No. 13/314,612 mailed Jan. 23, 2012, 12 pages.

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| CS/PS | 'VLR-restart' | | | | | | | Used NRI range | | | | | | | | | | | | | | | | | | | | | | | |

(Prior art)

FIG. 4

METHOD AND APPARATUS FOR ACCESSING LEGACY NETWORKS THROUGH TEMPORARY ID OF EVOLVED NETWORK

This application is a continuation of application Ser. No. 13/314,612, filed on Dec. 8, 2011, which is a continuation of application Ser. No. 12/649,942, filed on Dec. 30, 2009, which is a continuation of International Application No. PCT/CN2008/072864, filed on Oct. 28, 2008. The International Application claims priority to Chinese Patent Application No. 200710166066.8, filed on Nov. 1, 2007 and Chinese Patent Application No. 200810091433.7, filed on Apr. 11, 2008. All of these applications are hereby incorporated by reference in their entireties.

TECHNICAL FIELD

The present invention relates to mobile communication technologies and, in particular embodiments, to a method and apparatus for accessing legacy (i.e., pre-existing technology, such as 2G/3G) wireless networks through a temporary ID of an evolved network.

BACKGROUND

A Universal Mobile Telecommunication System (UMTS) is a 3G wireless communication network standard defined by the Third Generation Partnership Project (3GPP). A UMTS network consists of a Core Network (CN) and an Access Network (AN). The CN consists of a Circuit Switched (CS) domain and a Packet Switched (PS) domain. The CS domain provides CS-based services such as voice services. The PS domain provides PS-based services such as Internet access. A terminal used by a mobile subscriber is a User Equipment (UE).

In a prior art UMTS network, the CN generally includes a PS domain and a CS domain. The PS domain in the CN generally includes a Serving GPRS Support Node (SGSN), a Gateway GPRS Support Node (GGSN), and a Home Location Register (HLR). The CS domain on the CN generally includes a Mobile Switching Center (MSC), a Visitor Location Register (VLR), and a Gateway Mobile Switching Center (GMSC). The AN generally includes a Radio Network Controller (RNC) and a NodeB. Each RNC is connected to several NodeBs. Each SGSN is connected to several RNCs. An Iu interface is a key interface between the AN and the CN. Management and control of radio resources are isolated on the AN by the Iu interface, and thus the CN focuses solely on the service provision.

On a traditional network such as an R99 system, one RNC is connected to only one CN node. For example, one RNC is connected to only one SGSN. Thus, problems such as single point failure exist. If an SGSN is down, a UE in the service area of the SGSN cannot access the network, and thus cannot perform communications. To rectify the foregoing defect, a concept of "flex" is introduced. When a many-to-many relationship between AN devices and CN devices exists on an Iu interface, the Iu interface is called Iu-flex. In FIG. 1, there are Areas 1 to 8 governed respectively by 8 RAN nodes. A configuration of a "pool area" in the prior art is shown herein. In FIG. 1, a Radio Access Network (RAN) node (for example: an RAN node may be an RNC in legacy wireless network such as an R99 system) is connected to multiple SGSNs or multiple MSCs, and an SGSN or an MSC is connected to multiple RAN nodes. These SGSNs form a pool, and the areas governed by the RAN nodes which the SGSNs connect are called pool area (for example: CS pool—area 1 including Areas 1, 2, 5 and 6, CS pool—area 2 including Areas 2, 3, 6 and 7, PS pool—area 1 including Areas 1 and 5, and PS pool—area 2 including Areas 2, 3, 6 and 7). In a pool, multiple CN nodes such as SGSNs are connected to all Radio Access Network (RAN) nodes (such as RNCs) in the pool (for example: SGSNs 3 to 5 are connected to each RAN node in PS pool—area 2 and SGSNs 1 to 2 are connected to each RAN node in PS pool—area 1), which is different from a traditional mode where one AN node is connected to only one CN node. When a UE enters a pool area initially, an RAN node can select one CN node according to load sharing principles. Thus, when the UE moves or accesses the network in the pool, the UE is always anchored at the selected CN node. Therefore, single point failure and frequent relocation of CN nodes can be prevented because the UE does not need to change the CN node in the pool.

In the prior art, a network allocates a Temporary Mobile Station Identity (TMSI, which is allocated by an MSC in a CS domain) or a P-TMSI (which is allocated by an SGSN in a PS domain) to a UE after the UE is attached to the network.

FIG. 2 shows a network with TMSI/P-TMSI design in a prior art. The network includes four pools (Pools 1 to 4) whose areas have overlapped parts. Each pool includes five CN devices, which are differentiated with different Network Resource Identifiers (NRIs) (Pool 1 with NRIs 1 to 5, Pool 2 with NRIs 16 to 20, Pool 3 with NRIs 11 to 15, Pool 4 with NRIs 6 to 10). A Non Access Stratum (NAS) Node Selection Function (NNSF) and the TMSI uniqueness of a UE in a paging area are not affected, and therefore, duplicate NRIs can be used in non-adjacent pool areas (for example, NRI 11 can be reused in a pool area not adjacent to area related to pool 3, NRI 1 can be reused in a pool area not adjacent to area related to pool 1). Assume that each CN device can attach a maximum of 1,000,000 subscribers, while the overlapped pool areas have 12,000,000 subscribers, and other areas have fewer subscribers.

On the preceding network, 20 CN devices are sufficient to attach 12,000,000 subscribers. An NRI may be set to 5 bits ($2^5$=32, which can be used to identify 20 CN devices). The independently allocated ID of each device is 21 bits ($1000000=2^{20}$, which can be used to identify 2,000,000 subscribers), two bits are used to differentiate a PS domain from a CS domain, and the remaining four (32−5−21−2=4) bits are used for restart.

FIG. 3 shows a structure of the flex on an SAE network in the prior art. In a pool (such as Mobility Management Entity (MME) pool 1 or MME pool 2), multiple CN nodes such as MMEs (not shown in the figure) are connected to all RAN nodes such as eNodeBs (ENBs) 1 to 4, which is similar to the method of the prior art. When a UE initially enters the area related to the pool, an RAN node can select one CN node according to load sharing principles. Thus, when the UE moves or accesses the network in this pool, the UE is always anchored at the selected CN node. On the SAE network, pool areas may also be overlapped. In addition, the SAE network specifies that an MME pool area or an S-GW pool area includes a complete Tracking Area (TA, which is similar to a Location Area (LA) or a Routing Area (RA) on a UMTS network).

Assume that a UE is allocated one TA once. When the UE enters MME pool 1 (hereinafter referred to as MP1) for the first time, for example, when the UE enters ENB1, the UE selects one MME from MP1. When the UE moves from ENB1 to ENB2 and then to ENB3, the UE does not need to change the MME. When the UE moves to ENB4 that is not connected to the source MME and belongs only to MP2, the UE may reselect an MME in MP2. In FIG. 3, ENB2 and ENB3 belong to two MME pools; that is, ENB2 and ENB3 are connected to all MMEs in the two MME pools. Therefore, ENB2 and ENB3 are overlapped parts of MP1 and MP2. The advantage of overlapping is as follows: because ENB3 is connected to MP2, when the UE returns from ENB4 to ENB3, the UE does not need to reselect an MME until the UE returns to ENB 1, thus preventing ping-pong MME relocation. If ENB3 is not connected to MP2, ping-pong MME relocation occurs when the UE moves between ENB3 and ENB4.

With respect to the TA concept, it should be noted that on an SAE network, multiple TAs can be allocated to a UE, which is different from the practice in a UMTS network where only one LA or RA can be allocated to a UE. In FIG. 3, if a UE is registered in a pool, and if the TA list includes TA1 and TA2, the UE does not need to initiate an update when moving between ENB1 and ENB2. That is, the UE does not need to initiate an update when moving in the allocated TA list.

Currently, a TMSI problem about the SAE is as follows: the SAE needs to support multiple Radio Access Technologies (RATs), and therefore, several types of terminals access the network; to keep the system capacity, an SAE-TMSI (namely, SAE TMSI) may need to be extended to support more subscribers, to expand the capacity, and to simplify the network.

When assessing the operation of prior art networks the inventor identified at least the following problem: when a UE moves from an SAE network to a legacy (such as 2G/3G) network, the legacy network cannot identify the SAE-TMSI, and therefore, the newly selected SGSN cannot find the originally-assigned MME on the SAE network. As a result, the new SGSN cannot obtain the context of the UE. And, ongoing services for the UE maybe interrupted.

SUMMARY OF THE INVENTION

Embodiments of the invention provide a method and apparatus for accessing a legacy network through a temporary ID of an evolved network to rectify a technical defect in the prior art that a newly selected SGSN cannot obtain the context of a UE because the new SGSN cannot find the originally-assigned MME on an SAE network.

An embodiment of the invention provides a method for accessing a legacy wireless network, such as a 2G or 3G network. A radio access network (RAN) node in the legacy wireless network receives an access message sent by a User Equipment (UE) attempting to access the legacy wireless network. The access message comprises mobility management entity (MME) information identifying an MME accessed by the UE in an evolved network. The MME information is added by the UE from a temporary identity (ID) allocated by the MME to a first P-Temporary Mobile Station Identity (P-TMSI) in the access message. The RAN node selects a corresponding Serving GPRS Support Node (SGSN) in the legacy wireless network for the UE according to the first P-TMSI in the access message.

An embodiment of the invention further provides a communication system, which includes an MME in an evolved network and an RAN node in a legacy wireless network. The MME is configured to allocate a temporary ID to a UE, the temporary ID comprising MME information identifying the MME. The RAN node is configured to receive an access message sent by the UE attempting to access the legacy wireless network. The access message comprises the MME information. The MME information is added by the UE from the temporary ID to a first P-TMSI in the access message. The RAN node is also configured to select a corresponding SGSN in the legacy wireless network for the UE according to the first P-TMSI in the access message.

An embodiment of the invention further provides a non-transitory computer readable medium. The non-transitory computer readable medium stores computer executable instructions that when executed in a UE attempting to access a legacy wireless network perform the steps of: obtaining a temporary ID allocated by an MME in an evolved network, wherein the temporary ID comprises MME information for identifying the MME; adding the MME information from the temporary ID to a first P-TMSI in an access message; sending the access message to a RAN node in the legacy wireless network.

The technical solution in embodiments of the invention has the following advantage: when a UE moves from an evolved network to an old network, MME information for uniquely identifying an MME is added to an access message sent to the old network; therefore, the old network can determine and find the MME that is accessed by the UE in the evolved network without changing the RNC and SGSN on the old network.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 shows a structure of a TMSI/P-TMSI in the prior art;

DETAILED DESCRIPTION OF ILLUSTRATIVE EMBODIMENTS

Figure 1:
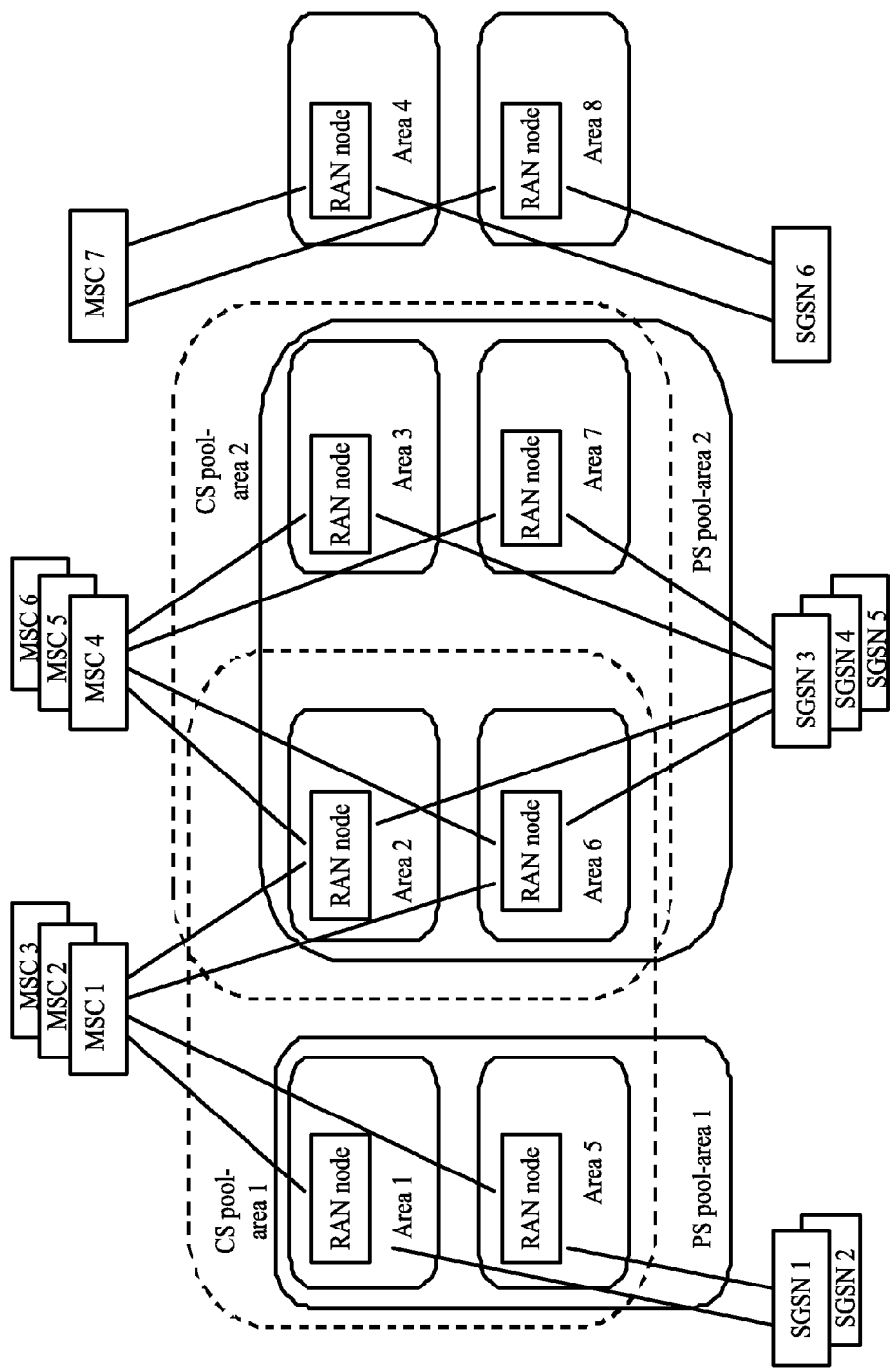
FIG. 1 shows a configuration of a pool area in the prior art.
Figure 2:
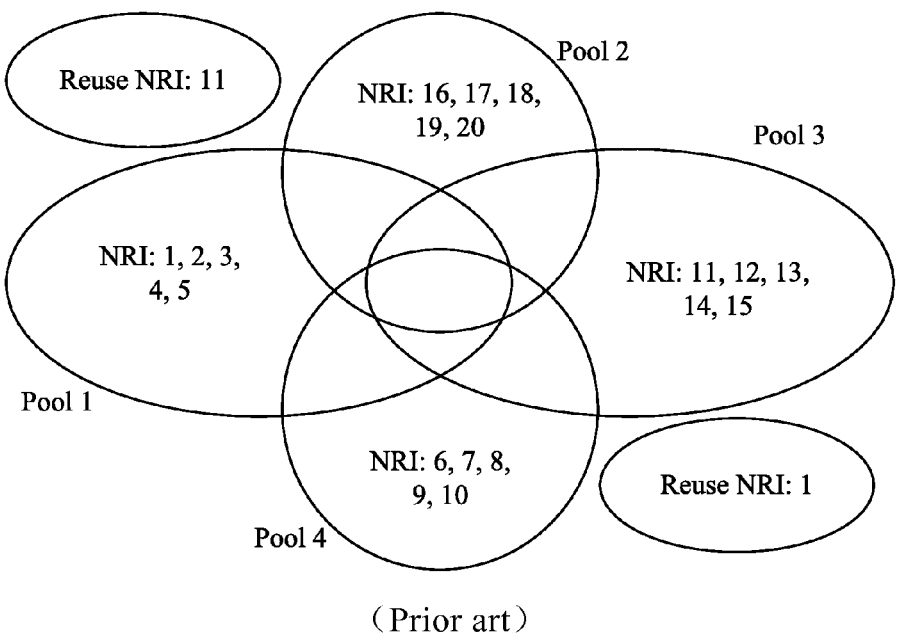
FIG. 2 shows a network with TMSI/P-TMSI design in the prior art.
Figure 3:
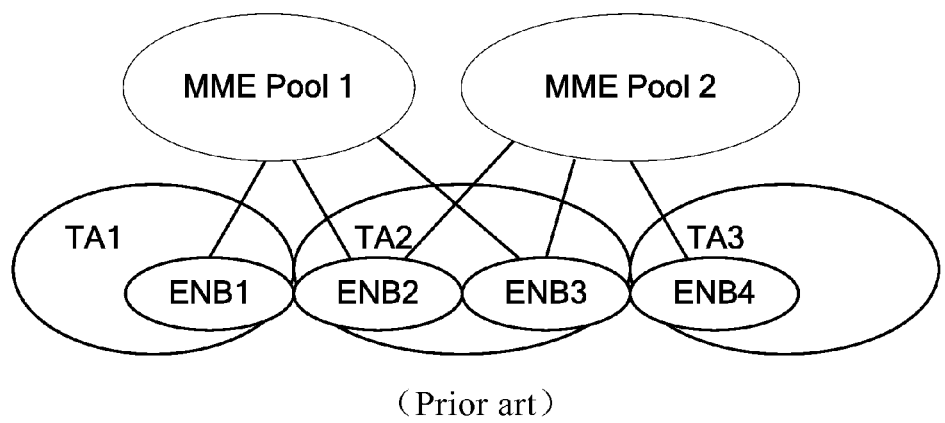
FIG. 3 shows a structure of the flex on an SAE network in the prior art.

Embodiments of the invention are hereinafter described in detail with reference to the accompanying drawings, in which corresponding reference characters represent corresponding elements.

A TMSI/P-TMSI is introduced to prevent a permanent ID, namely, an International Mobile Subscriber Identity (IMSI), from being exposed on an air interface and thus being tracked, so as to protect subscriber privacy. The TMSI is unique in an LA or RA of a UE (LA in a CS domain and RA in a PS domain, it being understood that one LA may include several RAs). Thus, when the UE accesses a network, the TMSI/P-TMSI is taken as the user ID. In addition, the TMSI/P-TMSI has the following function: when the UE accesses a new CN node and the flex concept is not introduced, the new CN node searches old nodes for the context of the UE through a Location Area Identity (LAI) or Routing Area Identity (RAI). A many-to-many relationship between AN devices and CN devices exists on the flex, and therefore, it is insufficient to search old nodes according to the LAI or RAI. Old nodes may be determined according to the LAI/RAI and the TMSI/P-TMSI.

The TMSI/P-TMSI has another function, that is, an RAN can find a node where the UE is registered according to the TMSI or P-TMSI information in the case of the flex. The specific method is as follows: the configurable bits 0-10 available in the TMSI or P-TMSI are used to identify a Network Resource Identifier (NRI) which is used to differentiate different CN nodes in a pool. Thus, when the UE accesses the pool for the first time, an RAN node selects a proper CN node for the UE according to the NNSF and load sharing principles. When the UE moves in the pool, the UE does not change the selected node. The principle is as follows: the CN node allocates one TMSI or P-TMSI to the UE and the TMSI or P-TMSI carries an NRI that represents the CN node. When the UE accesses the pool, an Initial Direct Transfer message sent by the UE carries the TMSI or P-TMSI. According to the NRI in the TMSI or P-TMSI, the RAN node finds and selects the CN node where the UE is originally registered. Thus, when the UE moves in the pool, the UE does not change the CN node. When the UE moves out of the pool, the RAN node reselects a new CN node because it cannot find the corresponding NRI. Subsequently, when the UE moves in the new pool, the UE still does not change the new CN node.

A TMSI or P-TMSI in the prior art consists of 32 bits, namely, several bits used to differentiate a PS domain from a CS domain (two bits generally), configurable bits 0-10 used to identify an NRI (Bit 0 indicates no flex), several bits used as a restart ID, and several other bits. These bits may be allocated according to the network deployment situation. FIG. 4 shows a structure of the TMSI or P-TMSI in a prior art. Two bits are used to differentiate the TMSI from the P-TMSI. A 5-bit restart ID is used to prevent that the allocated TMSI is reallocated because of node restart; the 5-bit restart ID may be associated with the time to prevent duplicate TMSIs from being allocated. Seven bits are used to identify an NRI. The remaining 18 bits may be used as an ID allocated to the UE by each CN device.

In a prior art, an RNC selects a new SGSN for a UE, and the new SGSN requests the context of the UE from the former (i.e., legacy network) SGSN according to the RAI+P-TMSI. The process can be described as follows. The UE initiates an RAU process and sends an RRC message (Initial Direct Transfer message) to the RNC. The message includes an RAU Request carrying the former RAI and former P-TMSI, where the RAU Request is located in the Non Access Stratum (NAS) information element (IE) of the RRC message. The RNC can see only the RRC message but does not parse the NAS message. According to the NRI information in the P-TMSI field carried on an Intra Domain NAS Node Selector Network Element (NE) of the RRC message, the RNC selects the corresponding SGSN, establishes a connection with the SGSN, and forwards the NAS message to the SGSN. If the RNC does not find the corresponding SGSN, it selects a new SGSN (in this process, the RNC selects a new SGSN).

According to the RAI and P-TMSI information carried in the received RAU Request, the new SGSN queries the address of the original SGSN in its configuration or domain name server (DNS). Then, the new SGSN sends a SGSN Context Request carrying the old RAI and old P-TMSI to the old SGSN to request the context of the UE. According to the old RAI and old P-TMSI information, the old SGSN finds the corresponding UE and returns the context of the UE to the new SGSN. After executing other processes such as updating a location to a Home Subscriber Server (HSS), the new SGSN allocates a new RAI and P-TMSI to the UE.

When the UE moves from an SAE network to a legacy network, the legacy network cannot identify the SAE-TMSI, and therefore, the newly selected SGSN cannot locate the former MME on the SAE network. As a result, the context of the UE cannot be obtained. In embodiments of the invention, when the UE moves from an evolved network such as an SAE network to a legacy network such as a 2G/3G network, the UE notifies the MME information of the MME where the UE is registered on the evolved network to the old network by sending an access message such as RAU or Attach to the old network. The MME information can uniquely identify the MME accessed by the UE in the evolved network. Thus, after the old network selects a new SGSN for the UE, the new SGSN determines and finds the MME according to the MME information in the access message, and then sends a Context Request or Identification Request to the MME to obtain the context (in the RAU process) or IMSI information (in the Attach process) of the UE. If a combined MME/SGSN exists, when the UE is registered with the combined node, the UE moves from an SAE system to a 2G/3G pool or from a 2G/3G pool to an SAE system, it is better to select the old combined node if possible to prevent context transfer. Embodiments of the invention can also implement the function.

According to different cases of MME information, embodiments of the invention provide different methods for adding the MME information to an access message. For example, if one MME corresponds to one MME-id on an evolved network, the MME-id can uniquely identify the MME; therefore, only MME-id being added to the P-TMSI or RAI information in the access message may works. If a pool exists on the evolved network, an MME has a unique MME-id in the pool; therefore, the Pool-id+MME-id should be used to determine the MME. If Pool-ids on different Public Land Mobile Networks (PLMNs) are duplicate, the PLMN-id+Pool-id+MME-id can uniquely determine the MME. In addition, the TAI+Pool-id+MME-id or PLMN-id+TAI+Pool-id+MME-id may also uniquely determine the MME. The pool is an area where a UE moves and the serving MME does not need to be changed. The following describes the preceding cases provided in embodiments of the invention in detail.

In embodiments of the invention, it is assumed that the UE accesses a legacy network (such as a 2G/3G network) through a temporary user ID (SAE-TMSI) of an evolved network. In some embodiments of the invention, a structure of the SAE-TMSI is provided, which includes the Pool-id, MME-id, UE temporary id, optional restart ID, and optional other IDs (the PLMN-id may be or may not be taken as one part of the SAE-TMSI). That is, the SAE-TMSI contains at least the Pool-id, MME-id, and UE-id. The Pool-id indicates the ID of a pool or area where the MME is located. The MME-id indicates the ID of an MME in the pool. The UE-id indicates an ID that uniquely identifies a UE in an MME. That is, the MME-id of the entire network is indicated by the Pool-id+MME-id.

The Pool-id may be unique or duplicate on the entire PLMN. The IDs of non-adjacent pools may be the same. Thus, if Pool-ids are duplicate, the SAE-TMSI and TAI information should be used together to identify an MME. The MME-id is a unique ID in the pool. The UE temporary id is an ID that may be allocated to the UE by each MME. A restart-id may also be added to the SAE-TMSI. The function of the restart-id is similar to the restart-id in a P-TMSI in a prior art; that is, the function is to prevent the same SAE-TMSIs from being allocated in the same MME. In addition, an ID used to differentiate a UMTS/SAE network or other IDs used to differentiate networks can be added to the SAE-TMSI.

The foregoing SAE-TMSI structure is a solution provided in embodiments of the invention, where an RNC and an SGSN on a prior network do not need to be changed. A benefit of use of the invention is that legacy networks can uniquely determine and identify an MME that is accessed by the UE on an evolved network, and thus obtain the context of the UE after the UE accesses the old network through the SAE-TMSI. When the following requirements are met, any change of the SAE-TMSI structure should be covered in the scope of protection of the invention. Embodiments of the invention take into account the following considerations for the SAE-TMSI.

1. The SAE-TMSI is secure and not easy to track.
2. An RAN selects an old CN node.
3. If a CN node changes, a new CN node finds the old CN node to obtain the context or ID of a UE through an LA or through an LA and a TMSI.
4. The corresponding UE is found in an old CN node when the SAE-TMSI functions as an index.

Obviously, the IDs that meet the preceding requirements for the SAE-TMSI are still in the SAE-TMSI range although their names are different.

Figure 5:
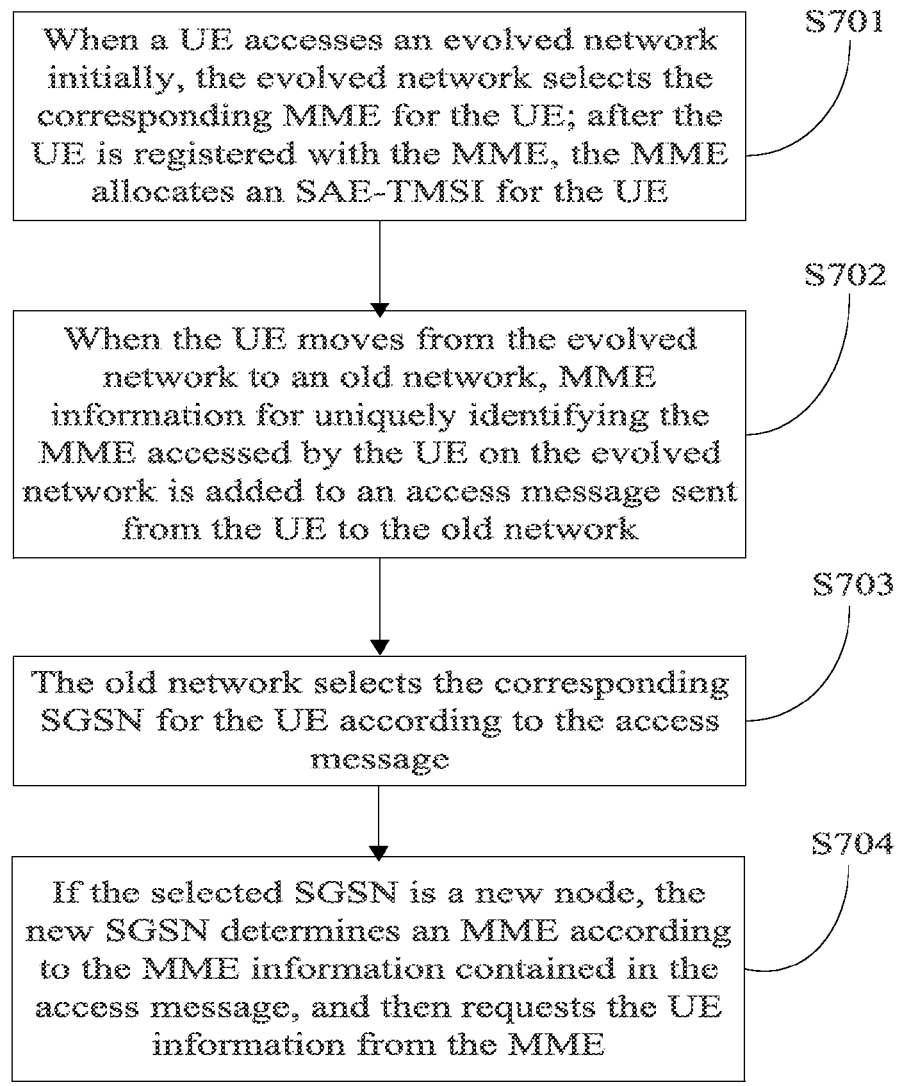
FIG. 5 is a flowchart of a method for accessing a legacy network through a temporary ID of an evolved network in a first embodiment of the invention.

FIG. 5 is a flowchart of a method for accessing an old network through a temporary ID of an evolved network in the first embodiment of the invention. The flowchart includes the following steps.

Step S701: When a UE initially accesses an evolved network, the evolved network selects the corresponding MME for the UE. For example, the evolved network selects the MME according to load sharing principles. After the UE is registered with the MME, the MME allocates an SAE-TMSI for the UE.

Step S702: If the UE moves from the evolved network to a legacy network (such as a 2G/3G network) and accesses the legacy network through the SAE-TMSI allocated by the evolved network, MME information for uniquely identifying the MME accessed by the UE in the evolved network is added to an access message sent from the UE to the legacy network. Because the SAE network configurations are different, MME information has several modes. The following describes different modes of carrying MME information.

Mode 1: On the evolved network, the MME has a unique MME-id, based on which the legacy network can determine and find the MME that is accessed by the UE in the evolved network. In an embodiment of the invention, the UE adds the MME-id to the RAI information and/or P-TMSI information carried in the access message. In another embodiment of the invention, the UE adds the MME-id to the P-TMSI information. The UE may also add the MME-id to the P-TMSI Signature of the access message.

On the evolved network, some of the functionality of the MME and SGSN may be combined. In this case, the legacy network may reselect another SGSN rather than the combined MME/SGSN for the UE when the UE moves from the evolved network to the legacy network (2G/3G network) in the same pool as the evolved network, and accesses the legacy network. This causes unnecessary node reselection and context transfer. Therefore, the NRI and the MME-id of the combined MME/SGSN may be the same. In addition, when the UE moves from the evolved network to the old network, the NRI information in the P-TMSI information carried in the access message is set as the MME-id. Thus, when the old network selects an SGSN for the UE, it selects the old combined MME/SGSN, thus avoiding node reselection.

Figure 6:
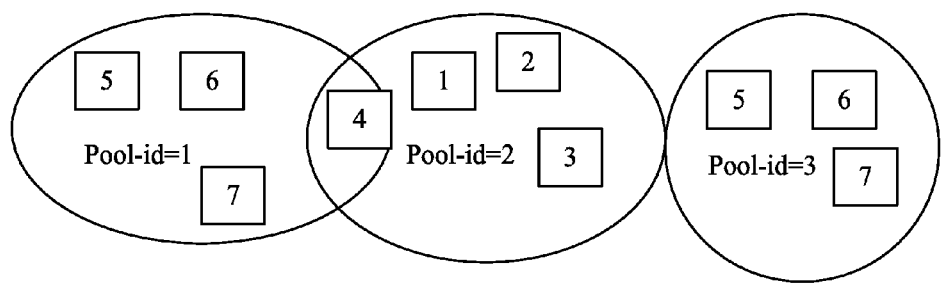
FIG. 6 shows how to select a combined MME/SGSN in an embodiment of the invention.

FIG. 6 shows a configuration of combined MME/SGSN in an embodiment of the invention. Blocks 1 to 7 indicate SGSN or MME with NRI or MME-id arranged from 1 to 7. Assume that blocks 4 indicates a combined MME/SGSN whose NRI and MME-id are equal to 4, blocks 6 indicates a combined MME/SGSN whose NRI and MME-id are equal to 6, and that blocks 1, 2, and 3 indicate a pure MME or SGSN whose NRI or MME-id is equal to 1, 2, and 3 respectively. Blocks 4, 5, 6 and 7 belong to pool 1 with Pool-id 1, blocks 1, 2, 3 and 4 belong to pool 2 with Pool-id 2 and blocks 5, 6 and 7 belong to pool 3 with Pool-id 3. According to a embodiment of the invention, when the UE is registered with node 6 (the combined MME/SGSN indicated by block 6) in pool 1, and is still in pool 1 when it moves from an SAE network to a 2G/3G network, the UE initiates access in the 2G/3G network, and uses an access message of the 2G/3G network and places the MME-id part of the SAE-TMSI to the NRI part of the P-TMSI.

Thus, upon reception of the message, a BSC or an RNC forwards the message to node 6 to establish a connection with node 6 through the information of NRI=6, and therefore, the combined SGSN/MME indicated by block 6 can still be selected, and the node does not change. When moving to a 2G/3G network in pool 2, the UE initiates an RAU process. A BSC or an RNC receives an Initial Direct Transfer message. According to the information of NRI=6, the BSC or RNC cannot find the corresponding node, and therefore, it initiates node selection and selects a new SGSN with NRI=2. After receiving the RAU Request, the SGSN queries information in the configuration or DNS according to the RAI and P-TMSI information. If the DNS is upgraded or the configuration is changed, the corresponding old MME address may be found according to the MME-id (or Pool-id+MME-id or PLMN-id+Pool-id+MME-id). The new SGSN sends a Context Request carrying RAI and P-TMSI information to the MME. According to the implicit SAE-TMSI information in the RAI and P-TMSI, the old MME finds the corresponding UE and returns the context of the UE to the new SGSN.

According to the foregoing descriptions, placing the MME-id part of the SAE-TMSI to the NRI part of the P-TMSI is one solution of the embodiment of the invention. Thus, unnecessary node reselection can be avoided efficiently.

In addition, if the UE moves from the 2G/3G network (old network) to the SAE network (evolved network), the UE accesses the SAE network through the P-TMSI. An ENB (RAN node of the evolved network) selects the MME with MME-id=NRI. For example, if the UE moves from the SAE network to the 2G/3G network, and the UE has been registered with the combined node 6 in pool 1, the accessed 2G/3G network still belongs to pool 1. Then, the ENB still selects the old combined MME/SGSN indicated by block 6. If the ENB cannot find the corresponding MME, it triggers a new MME selection process and selects a new MME for the UE.

Mode 2: On the evolved network, the MME-id is unique in the same pool, but duplicate IDs may exist on the entire evolved network. The Pool-id is unique on the entire evolved network (PLMN). Therefore, the Pool-id+MME-id can uniquely identify the MME accessed by the UE in the evolved network. In an embodiment of the invention, the SAE-TMSI contains the unique Pool-id on the PLMN, unique MME-id in a pool, and unique UE-id (and other possible fields) in an MME. That is, the MME can be identified by the unique Pool-id on the PLMN and the unique MME-id in the pool.

The UE adds the Pool-id and the MME-id to the RAI and/or P-TMSI information carried in the access message; that is, the Pool-id and the MME-id are mapped to the RAI and/or P-TMSI field.

In an embodiment of the invention, the Pool-id and the MME-id are added to the RAI information and the P-TMSI information. The NRI information of the P-TMSI information in the access message is set as the MME-id, and the Pool-id is added to other information except the NRI (such as the other part of the P-TMSI or the LAC and/or RAC part of the RAI, or other part of the RAI except the Mobile Country Code (MCC) and the Mobile Network Code (MNC) and other part of the P-TMSI except the NRI); other information includes P-TMSI information, RAI information, or P-TMSI Signature. The RAI or P-TMSI information may also carry other IEs of the SAE-TMSI.

Figure 7:
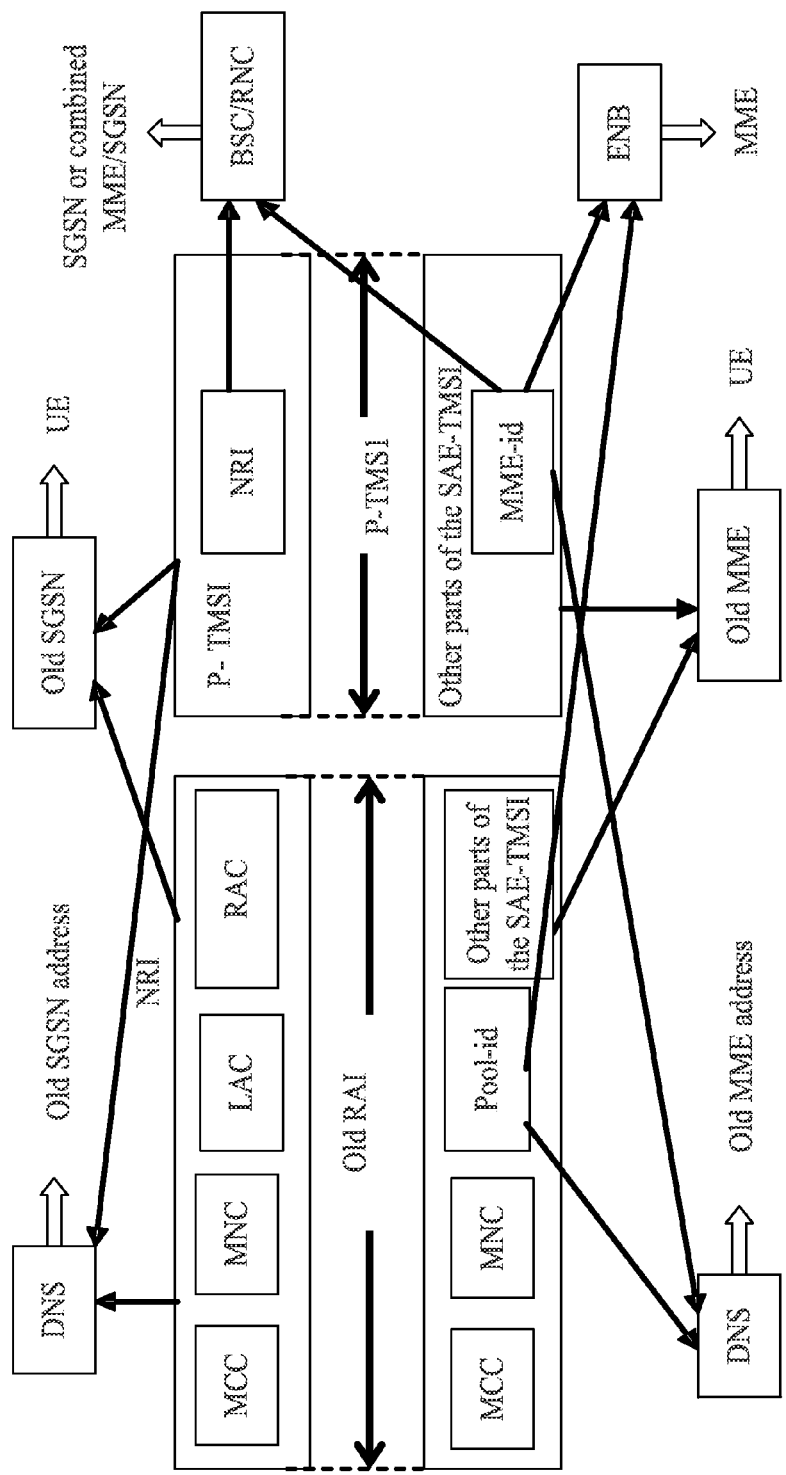
FIG. 7 shows how to add a Pool-id and an MME-id to Routing Area Update (RAU) information and P-TMSI information in an embodiment of the invention.

FIG. 7 shows how to add the Pool-id and the MME-id to RAI information and P-TMSI information in an embodiment of the invention. For example, in FIG. 7, the Pool-id is added to the RAI. The Pool-id may also occupy the P-TMSI or a part of RAI and a part of P-TMSI. To avoid unnecessary node reselection when a combined MME/SGSN exists, in another embodiment of the invention, the MME-id part of the SAE-TMSI is placed to the NRI part of the P-TMSI (the NRI and the MME-id of the combined MME/SGSN may be the same). If the SAE-TMSI is longer than the P-TMSI (for example, the length is 40 bits or 56 bits), the other part may occupy certain bits of the RAI and/or certain bits of the P-TMSI Signature (not shown in FIG. 7). In an embodiment of the invention, only certain bits of the RAI are occupied to prevent the SGSN and the RNC from being changed.

The Pool-id and other part of the SAE-TMSI may be placed to the P-TMSI information except the NRI. If the SAE-TMSI is longer than the P-TMSI, the LAC and/or RAC part of the RAI can also be occupied. Thus, the length of the SAE-TMSI can be extended to a maximum of 56 bits. Therefore, the mode does not limit the number of MMEs on the PLMN. That is, the number of MMEs depends on the Pool-id+MME-id. The maximum number of MMEs in a pool is 1024 (210 because the maximum MME-id is the length of the NRI, namely, 10 bits). If no interaction with the 2G/3G network is required, the number of MMEs in a pool is not limited by the length of the NRI.

Similarly, if the UE moves from the 2G/3G network to the SAE network, the UE accesses the SAE network through the P-TMSI. In this case, the RAN node such as the ENB of the evolved network tries to select the MME with MME-id=NRI. For example, if the UE moves from the SAE network to the 2G/3G network, and the UE has been registered with the combined node 6 in pool 1, the accessed 2G/3G network still belongs to pool 1. Then, the ENB still selects the old (i.e., pre-existing) combined MME/SGSN (6). If the ENB cannot find the corresponding MME, it triggers a new MME selection process and selects a new MME for the UE.

Therefore, an embodiment of the invention provides an optimized mode: in the case of a pure SAE network, Pool-IDs may not be duplicate on the PLMN and MME-ids may not be duplicate in a pool; in the case of a hybrid network of an SAE network and a 2G/3G network, the NRI of the SGSN of the combined MME/SGSN may be equal to the MME-ID of the MME of the combined MME/SGSN, and the MME-ID of a pure MME should not be the same as the NRI of a pure SGSN in adjacent pools.

It should be noted that after the UE accesses the 2G/3G network through the SAE-TMSI and selects a new SGSN, the SGSN may search the DNS or configuration for the old (i.e., pre-existing) node according to the P-TMSI and the RAI (SAE-TMSI information actually from the SGSN point of view). If the DNS or configuration is upgraded, the old MME address can be uniquely determined and found according to the PLMN-id (MCC+MNC in the RAI) in the SAE-TMSI information, Pool-ID, and MME-id. The SGSN sends a Context Request or Identification Request message carrying the P-TMSI and the old RAI (including the SAE-TMSI actually from the SGSN point of view). After receiving the message, the MME finds the UE according to the SAE-TMSI and returns the context of the UE.

Mode 3: In this mode, the PLMN-id belongs to a part of the SAE-TMSI. On the evolved network, the MME-id is unique in a pool, but duplicate IDs may exist on the entire evolved network. A Pool-id is not unique on different PLMNs. Therefore, the PLMN-id (MCC+MNC) should be used with the Pool-id+MME-id to identify the MME accessed by the UE in the evolved network. That is, the MME is uniquely identified by the PLMN-id+Pool-id+MME-id.

As shown in FIG. 7, the NRI information of the P-TMSI information in the access message is set as the MME-id. The RAI, P-TMSI, and P-TMSI Signature can carry the PLMN-id and the Pool-id. For example, the PLMN-id (MCC and MNC in FIG. 7) is added to the RAI information, and the Pool-id is added to the other part of the P-TMSI information except the NRI; the PLMN-id and the Pool-id can be added to the RAI information or P-TMSI Signature information (Not shown in FIG. 7). In an embodiment of the invention, a specific mode is to set the NRI information as the MME-id. The RAI, P-TMSI Signature, and P-TMSI can separately carry or together carry the PLMN-id and the Pool-id.

To avoid unnecessary node reselection when a combined MME/SGSN exists, another embodiment of the invention places the MME-id part of the SAE-TMSI to the NRI part of the P-TMSI (the NRI and the MME-id of the combined MME/SGSN may be the same).

Figure 8:
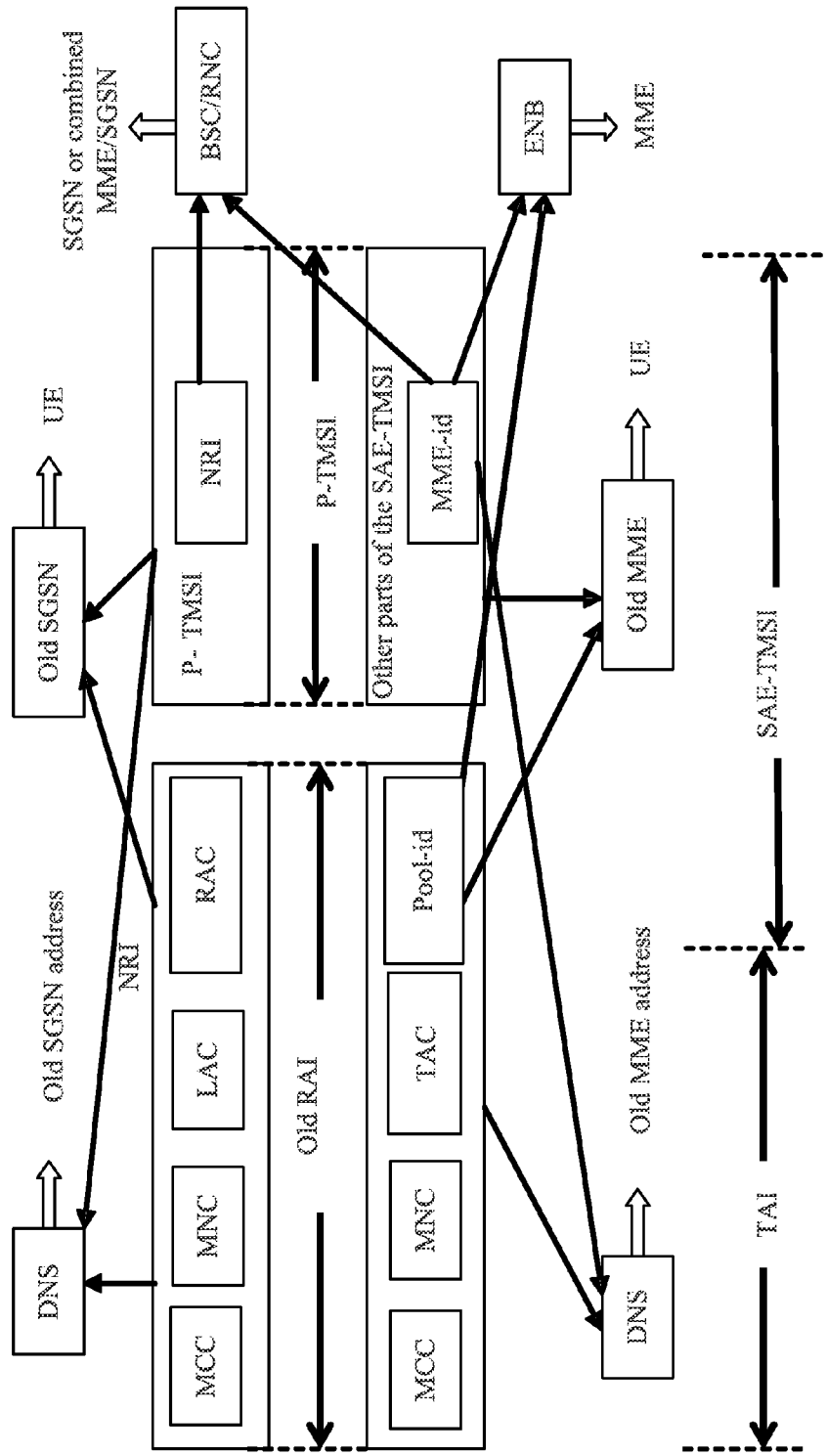
FIG. 8 shows how to add a TAI, a Pool-id, and an MME-id to RAU information and P-TMSI information in an embodiment of the invention.

Mode 4: When the Pool-id and the MME-id are not unique on the PLMN, for example, Pool-ids on the PLMN may be duplicate (Pool-ids of adjacent pools should be different), the old MME may be determined by combining the Pool-id and the MME-id with the TAI; that is, the MME is uniquely identified by the TAI+Pool-id+MME-id. FIG. 8 shows how to add a TAI, a Pool-id, and an MME-id to RAU information and P-TMSI information in an embodiment of the invention. The UE may provide the TAI information, which is shown as TAC in FIG. 8, to the old network. Because the SAE-TMSI may be extended, the SAE-TMSI+TAI may occupy the position of the old RAI+P-TMSI. If the TAC occupies 20 bits, four bits may be provided for the SAE-TMSI. Thus, the SAE-TMSI has 36 bits. (The P-TMSI field is 32 bits in length, and the LAC+RAC is 24 bits in length.) If the UE accesses a 2G/3G network through the SAE-TMSI, the MME selects a proper SGSN at the NRI position, and the SGSN searches the updated DNS or configuration for the old MME and finds the old MME through the TAI+Pool-id+MME-id.

The Pool-id may be combined with the MME-id into one MME-id. In an embodiment of the invention, the NRI information in the P-TMSI information of the access message is set as the MME-id, and the TAI and the Pool-id are added to the RAI information. To avoid unnecessary node reselection when a combined MME/SGSN exists, another embodiment of the invention places the MME-id part of the SAE-TMSI to the NRI part of the P-TMSI (the NRI and the MME-id of the combined MME/SGSN may be the same).

Step S703: The legacy network selects the corresponding SGSN for the UE according to the access message. According to the NRI of the P-TMSI information carried in the received access message, the legacy network selects the corresponding SGSN. If no corresponding SGSN exists, the old network selects a new SGSN. If the UE accesses the new SGSN, the UE sends the RAI IE and P-TMSI information carried in the NAS message to the new SGSN.

Step S704: If the selected SGSN is a new node, the selected SGSN determines an MME according to the MME information carried in the access message and requests the UE information from the MME. Specifically, the configuration information or DNS of the SGSN is upgraded, and the SGSN searches the configuration information or DNS for the MME according to the MME information. For example, the corresponding address of the old MME can be found through the MME-id (or Pool-id+MME-id or PLMN-id+Pool-id+MME-id), and the new SGSN sends a Context Request carrying the RAI and P-TMSI information to the MME; the old MME finds the corresponding UE according to the implicit SAE-TMSI information in the RAI and P-TMSI and returns the context of the UE to the new SGSN.

Mode 5: According to the foregoing embodiments, an embodiment of the invention provides a embodiment of carrying SAE-TMSI information is provided. The mode for a UE to access an old (i.e., legacy) network such as a 2G/3G network in the prior art is as follows: P-TMSI information is placed in a received RRC message (Initial Direct Transfer message), and an RAN node such as an RNC or a BSC finds the corresponding SGSN according to the NRI information in the P-TMSI information; in addition, the NAS message in the RRC message carries P-TMSI information, that is, two P-TMSIs; the P-TMSI (and the old RAI, as well as the possible P-TMSI Signature) in the NAS message is transferred to an SGSN, and the RAN node such as the RNC or BSC does not parse the P-TMSI information in the NAS message.

Figure 9:
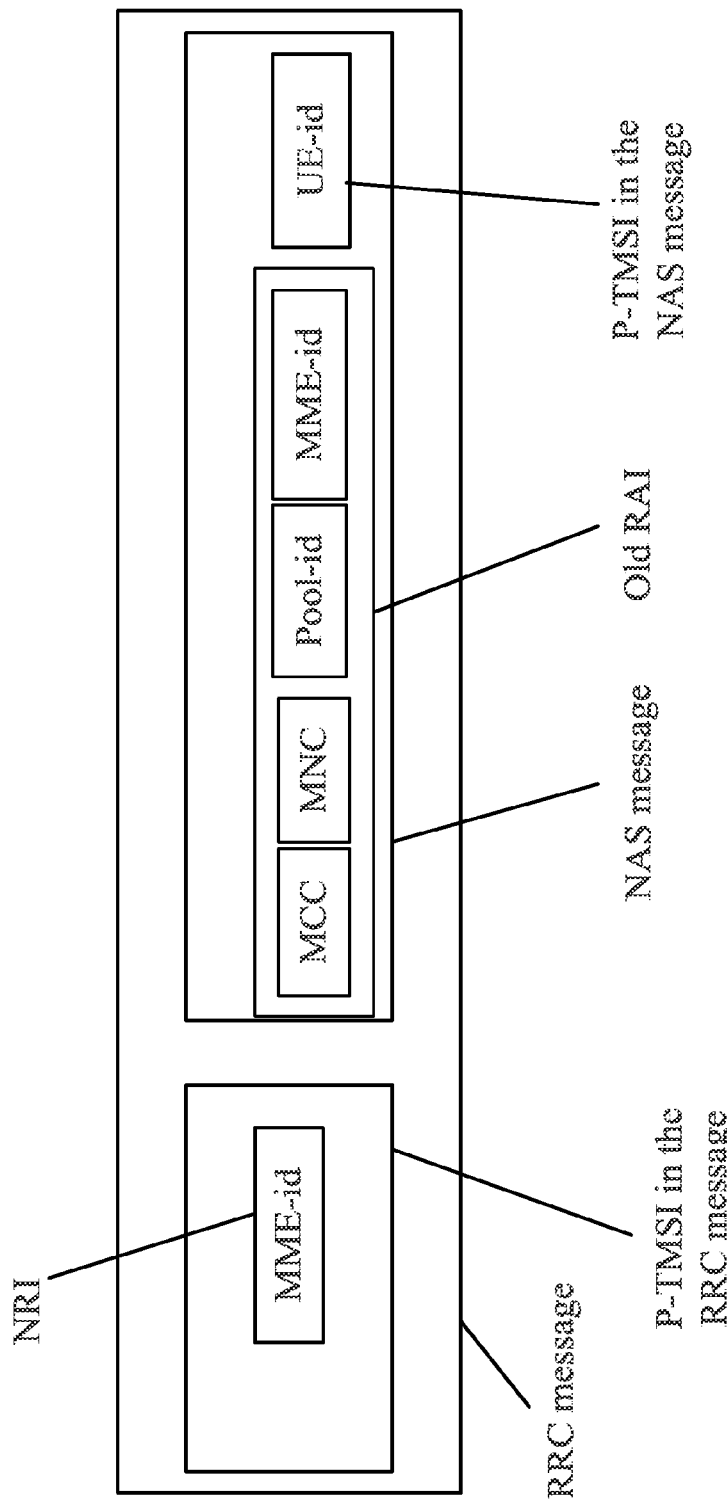
FIG. 9 shows how to occupy a Radio Resource Control (RRC) message in an embodiment of the invention.

Therefore, the method of this mode is as follows: only the P-TMSI in the RRC message is changed; the NRI information is set as the MME-id; and the information of the P-TMSI in the RRC message except the NRI information may not be processed, for example, may be set to zero. With regard to the P-TMSI, RAI, and P-TMSI Signature in the NAS message, the MME information is placed to the P-TMSI and/or the RAI only, and thus the old MME address can be found in the DNS or SGSN configuration. The MME-id does not need to be placed in the NRI information of the P-TMSI information in the NAS message. FIG. 9 shows an embodiment of using RRC message when a UE accesses an old 2G/3G network through the SAE-TMSI.

As shown in FIG. 9, the NRI information of the P-TMSI information in an RRC message is set to MME information, such as the MME-id. In the NAS message, the old MME should be found according to the old RAI and the P-TMSI only. For example, the Pool-id and the MME-id are set in the old RAI, the UE-id and other bytes are placed in the P-TMSI. In another embodiment of the invention the MME-id does not need to be placed in the NRI information of the P-TMSI information in the NAS message. Other implementation modes may also be adopted. For example, the global MME-id is placed to the old RAI, or the TAI is placed to the P-TMSI, or a duplicate MME-id is placed to the old RAI, and even the P-TMSI Signature can be used (for example, the global MME-id is placed to the old RAI and the P-TMSI, and the UE-id is placed to the P-TMSI Signature). Thus, the length of the SAE-TMSI can be further extended. The MME information such as the Pool-id, MME-id, and TAI are placed to the old RAI and/or P-TMSI, thus reducing the configurations of DNSs or SGSNs.

According to the DNS or configuration, the pre-existing MME/SGSN can be identified. It is possible that the identified pre-existing MME/SGSN is not the actual previously-assigned MME/SGSN of the UE. For example, if the UE accesses an SGSN that is not configured with the flex, of another PLMN, and the SGSN searches for the address of the default MME/SGSN according to only the RAI information, the new SGSN sends a Context Request or Identity Request message carrying RAI and P-TMSI information to the MME/SGSN. After receiving the message, the default MME/SGSN identifies the actual MME/SGSN according to the RAI and P-TMSI information, and then forwards the message to the actual MME/SGSN.

If the UE accesses the SAE network again through the allocated SAE-TMSI, an eNB can select the pre-existing MME according to the MME-id or Pool-id of the SAE-TMSI and the MME-id. If there is no corresponding MME, the eNB selects a new MME. The new MME identifies the pre-existing MME according to the Pool-id and the MME-id in the SAE-TMSI. The pre-existing MME identifies the UE according to the SAE-TMSI and returns the context of the UE to the new MME.

Mode 6: According to the foregoing embodiments, an embodiment of the invention further provides another embodiment of carrying SAE-TMSI information is provided. In the foregoing modes, the PLMN-id, TAI, and Pool-id (or MME-id) may be added to the access message by occupying the P-TMSI Signature. In this mode, the method for occupying the P-TMSI Signature is primarily described, but it does not means that this mode can be implemented by occupying the P-TMSI Signature only. The embodiment can be used with other information, such as RAI information and/or P-TMSI information.

The P-TMSI Signature is used to ensure the security. When a UE accesses a 2G/3G network, the UE can carry the pre-existing RAI, P-TMSI, and P-TMSI Signature to the access network. If an SGSN changes, the new SGSN uses the pre-existing RAI and the P-TMSI to query the address of the previously-assigned SGSN. Then, the new SGSN sends an Identification Request and a Context Request that may carry the optional parameter P-TMSI Signature besides the old RAI and P-TMSI, to the pre-existing SGSN. Therefore, when the UE accesses the legacy network through the SAE-TMSI, the SAE-TMSI may occupy the P-TMSI Signature when the new SGSN finds the address of the old MME according to the old RAI and the P-TMSI.

Figure 10:
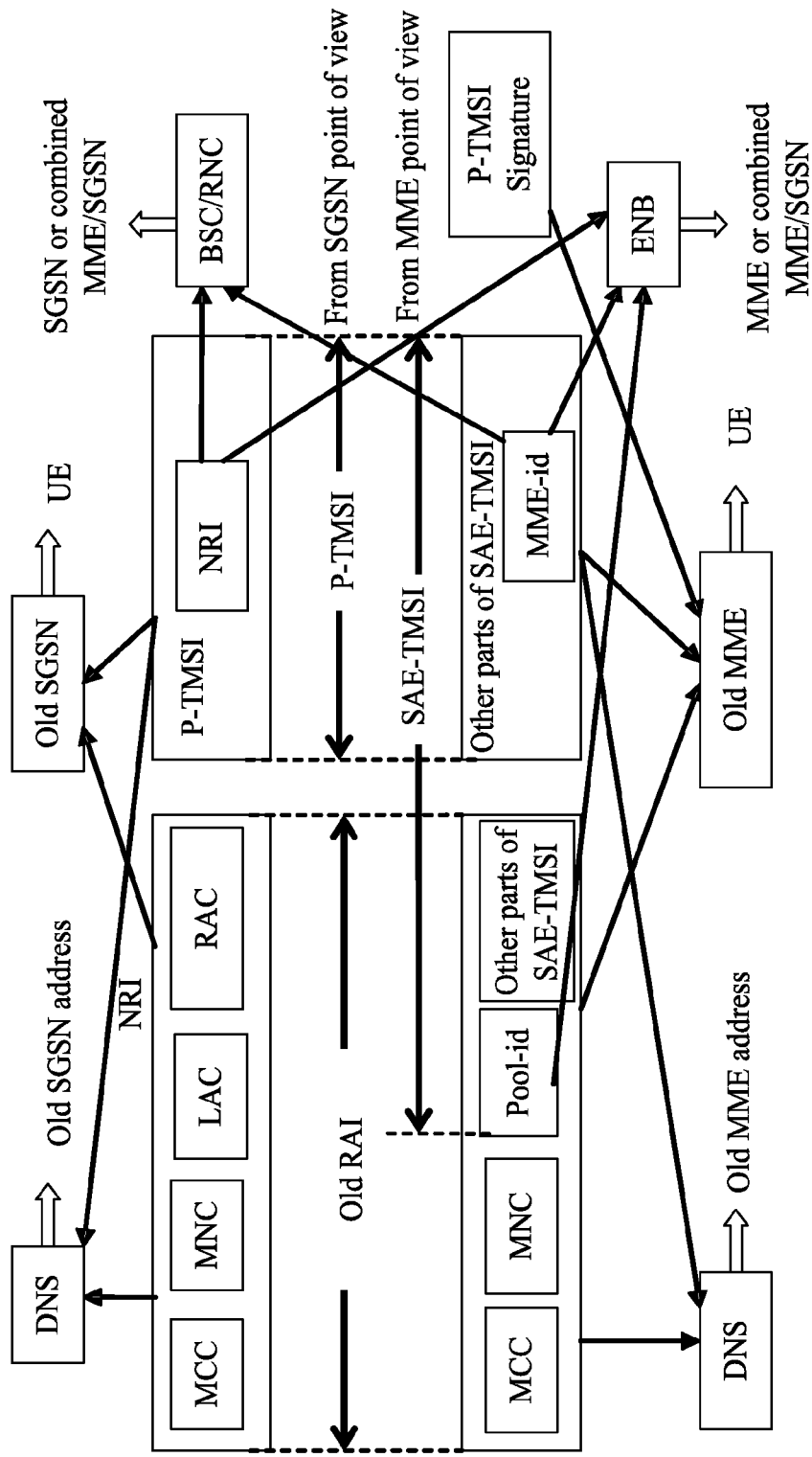
FIG. 10 shows how to occupy a P-TMSI Signature in an embodiment of the invention.

FIG. 10 shows how to occupy the P-TMSI Signature in an embodiment of the invention. Assume that the SAE-TMSI in the embodiment consists of at least the Pool-id (the Pool-id is unique on the entire PLMN), MME-id, and UE-id. The Pool-id and the MME-id may be placed to the pre-existing RAI and/or P-TMSI information. The MME-id may still be placed in the NRI. Other fields occupy not only the old RAI and P-TMSI information but also certain bits of the P-TMSI Signature. For example, the P-TMSI Signature has 24 bits, where ten bits are used for SAE security, and the remaining part may occupy certain bits (information necessary for querying the address of the old MME, such as the Pool-id and the MME-id cannot be placed in these bits) such as six bits according to the configuration length of the SAE-TMSI. Thus, after the UE accesses a new SGSN, the new SGSN queries the address of the old MME according to the old RAI and the P-TMSI. The new SGSN can find the address of the old MME according to the PLMN-id+Pool-id+MME-id if the configuration of the DNS or SGSN is upgraded.

The new SGSN sends a Context Request carrying the old RAI, P-TMSI, P-TMSI Signature to the address of the old MME. The MME identifies the corresponding UE through the SAE-TMSI formed by these parameters, and returns the context of the UE. In another embodiment, such as the Mode 5 discussed above, the MME-id of the P-TMSI information in a NAS message does not need to be placed in the NRI information.

The Pool-id may not be unique, and in some aspects of the invention, is not even required, and the corresponding MME is determined by a combination of the TAI information and the MME-id. For example, the UE accesses a 2G/3G network through the SAE-TMSI and the old TAI. The SAE-TMSI includes an MME-id (The MME-id may be unique on the entire PLMN or unique in a pool. In the embodiment, assume that the MME-id is unique in a pool). The UE places the TAI information to the old RAI information and places the MME-id to the NRI information.

The remaining information occupies the position of other remaining information of the old RAI and the P-TMSI, and even occupies the P-TMSI Signature that does not participate in query of the old MME. If the old MME can be queried according to the old RAI and the P-TMSI (the TAI and the MME-id actually), the other part of the SAE-TMSI that does not participate in query of the old MME may occupy the P-TMSI Signature. The new SGSN sends a request to the found MME address. The MME finds the UE according to a regrouped SAE-TMSI according to the parameters that are sent and returns a response.

The length of the SAE-TMSI may reach 80 bits by occupying the P-TMSI Signature. (Note that the information such as the MME-id, Pool-id, and TAI information used to query the MME cannot be placed to the P-TMSI Signature.)

In the foregoing embodiments, when a UE moves from an evolved network to an old network, MME information for uniquely identifying an MME is added to an access message sent to the old network; therefore, the old network can determine and find the MME that is accessed by the UE in the evolved network without changing an RNC and an SGSN on the old network. Especially, when a combined MME/SGSN exists, unnecessary mode reselection can be avoided efficiently by setting the MME-id of the MME in the combined node to be the same as the NRI of the SGSN. (A configuration method can also be used, and therefore, the MME-id may be different from the NRI.)

Figure 11:
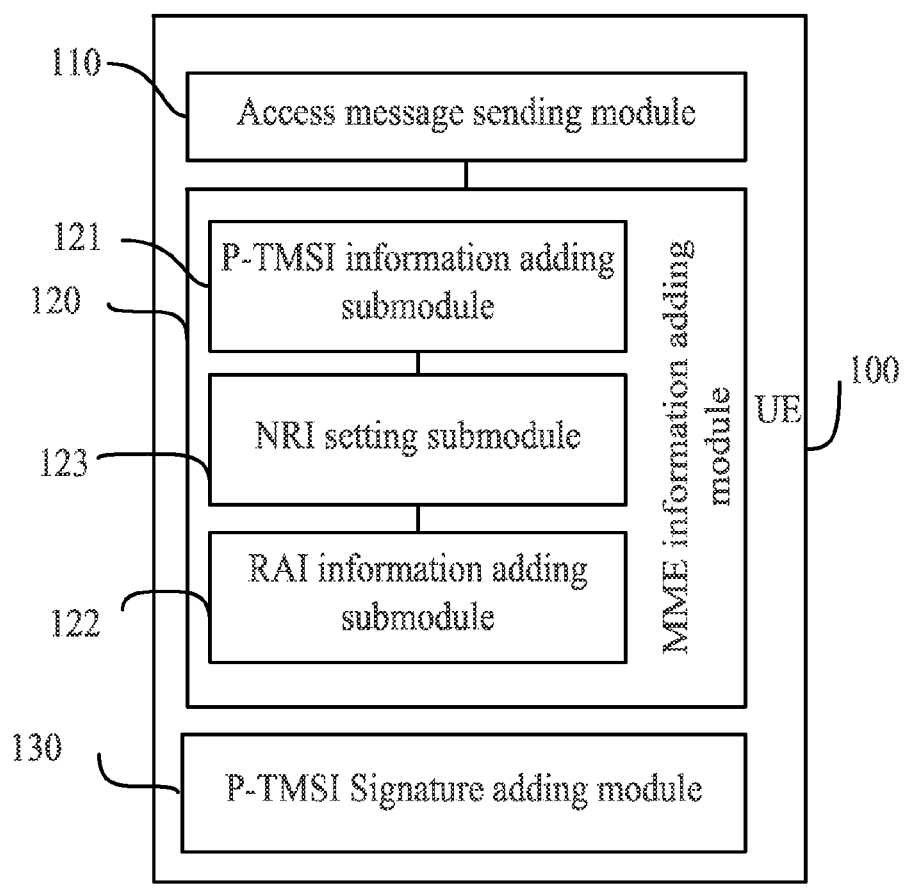
FIG. 11 shows a structure of a UE in an embodiment of the invention.

FIG. 11 shows a structure of a UE 100 in an embodiment of the invention. The UE 100 includes an access message sending module 110 and an MME information adding module 120. The access message sending module 110 is adapted to send an access message to an old network when the UE 100 moves from an evolved network to the old network. The MME information adding module 120 is adapted to add MME information for uniquely identifying an MME accessed by the UE 100 on the evolved network to the access message sent by the access message sending module 110.

The MME information adding module 120 includes a P-TMSI information adding submodule 121, which is adapted to add the MME-id in an SAE-TMSI to the P-TMSI information of the access message.

The MME information adding module 120 includes an RAI information adding submodule 122, which is adapted to add the Pool-id, and PLMN-id or TAI or PLMN in the SAE-TMSI to the RAI information of the access message.

The MME information adding module 120 further includes an NRI setting submodule 123, which is adapted to set the NRI information in the P-TMSI information of the access message as the MME-id, thus avoiding unnecessary node reselection when a combined MME/SGSN exists.

The UE 100 further includes a P-TMSI Signature adding module 130, which is adapted to add other information in the SAE-TMSI except the MME information to the P-TMSI Signature.

Figure 12:
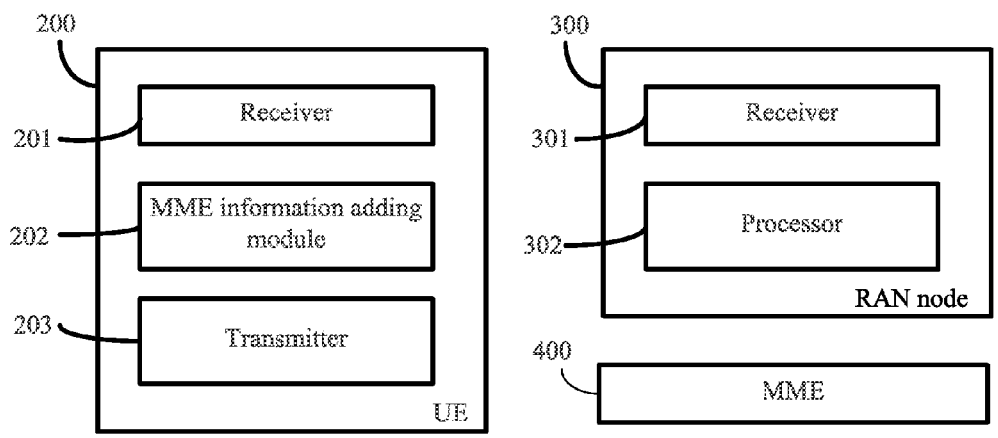
FIG. 12 shows a communication system in an embodiment of the invention.

FIG. 12 shows a communication system in an embodiment of the invention, which includes an MME 400 in an evolved network and an RAN node 300 in a 2G/3G network in communication with a UE 200.

The UE 200 includes a receiver 201, a transmitter 203 and a MME information adding module 202.

The receiver 201 is configured to obtain a temporary identity (ID) allocated by the MME 400 in an evolved network, wherein the temporary ID comprises MME information for identifying the MME 400.

The MME information adding module 202 is configured to add the MME information from the temporary ID to a first P-TMSI in an access message, when the UE accessing a 2G/3G network.

The transmitter is configured to send the access message to the RAN node (such as the RAN node 300) in the 2G/3G network.

The RAN node 300 includes a receiver 301 and a processor 302.

The receiver 301 is configured to receive an access message sent by a UE (such as the UE 200) that accesses the 2G/3G network, wherein the access message comprises MME information identifying an MME accessed by the UE in an evolved network, and the MME information is added by the UE from a temporary ID allocated by the MME to a first P-TMSI in the access message; and The processor 302 is configured to select a corresponding SGSN in the 2G/3G network for the UE according to the first P-TMSI in the access message.

In addition, corresponding to the methods provided in the foregoing embodiments, the following case exists: The SAE-TMSI of a UE consists of an MCC, an MNC, a Pool-id, an MME-id, and an M-TMSI (remaining SAE-TMSI bits). A global MME ID is composed of the MCC+MNC+Pool-id+MME-id. The SAE-TMSI can uniquely identify a UE globally.

In a UMTS PS domain or GPRS system, the temporary ID of a UE is a P-TMSI. The P-TMSI uniquely identifies a UE in an RA. The P-TMSI and the RAI can uniquely identify a UE globally.

In addition, the following scenario may exist when a 2G/3G network and an SAE network are deployed: a standalone SGSN and a standalone MME exist, and a combined MME/SGSN also exists. When a UE accesses a standalone SGSN, a P-TMSI and an RAI are allocated to the UE, and a P-TMSI Signature may also be allocated to the UE. The following RAI and P-TMSI combination includes the P-TMSI Signature. When the UE accesses a standalone MME, an SAE-TMSI is allocated to the UE. When the UE accesses a combined MME/SGSN, the combined node may allocate an SAE-TMSI or an RAI/P-TMSI combination to the UE. The SAE-TMSI and the RAI/P-TMSI can be mutually mapped; for example, the MCC+MNC+Pool-id+MME-id in the SAE-TMSI and the RAI can be mutually mapped, and the M-TMSI in the SAE-TMSI and the P-TMSI can be mutually mapped, or any other mapping method may be used (Certain bits are mapped to the P-TMSI Signature).

If the UE accesses a 2G/3G network, the RAI and the P-TMSI are allocated to the UE. If the UE accesses an LTE network, a combined node allocates an SAE-TMSI to the UE. Thus, when the UE accesses an SAE network, the UE uses the SAE-TMSI (if available) for access. An ENB finds the old MME through the MME-id information in an RRC message or selects a new MME (if the MME corresponding to the MME-id does not exist). If a new MME is accessed, the new MME may find the old MME and the UE context according to the SAE-TMSI, thus obtaining the context of the UE. If the UE has only the RAI/P-TMSI and accesses the SAE network, the RAI/P-TMSI is mapped to an SAE-TMSI for access.

That is, when the UE accesses the SAE network, the network considers that the ID carried by the UE is the SAE-TMSI, which is the same as the SAE-TMSI that is actually carried by the UE. Specifically, the UE carries the mapped SAE-TMSI in an RRC Connection Complete message; the ENB finds the old MME (such as a combined node) according to the mapped MME-id or selects a new MME; the new MME finds the old SGSN and the UE context according to the mapped SAE-TMSI, thus obtaining the context of the UE. When the UE accesses the 2G/3G network, the UE uses a P-TMSI and an RAI (if available) for access. An RNC finds the old SGSN according to the NRI in the P-TMSI information of an RRC message or selects a new SGSN (if the SGSN corresponding to the NRI does not exist). If the UE has only an SAE-TMSI and accesses the 2G/3G network, the UE accesses the network by mapping the SAE-TMSI to the RAI/P-TMSI. The foregoing mapping method may be used to access the old SGSN (a combined node) or a new SGSN. The new SGSN finds the old MME and the UE according to the mapped RAI/P-TMSI to obtain the context of the UE.

In the foregoing method, the combined node may allocate two IDs (the SAE-TMSI and the RAI/P-TMSI combination) to the UE only when the Idle mode Signaling Reduction (ISR) feature is enabled. Thus, the UE can know whether the ISR feature is enabled according to one or two IDs received rather than extra signaling or an extra parameter.

Furthermore, there is another solution: when the UE accesses a standalone SGSN, a P-TMSI and an RAI are allocated; when the UE accesses a standalone MME, an SAE-TMSI is allocated; when the UE accesses a combined MME/SGSN, the combined node allocates an SAE-TMSI and an RAI/P-TMSI combination, which cannot be mutually mapped, to the UE. The problem is as follows: when a UE supports only one RAT, for example, the UE belongs to the old network and supports only the 2G/3G access technology, and when the ID of an RAT that is not supported is allocated to the UE, the UE cannot use or even cannot save the ID.

Therefore, when the UE accesses a network, it may carry the RAT capability supported by the UE. A combined node obtains the RAT capability supported by the UE; for example, it may obtain the RAT capability from the UE or the context of the UE to determine how to allocate an ID. For example, the combined node allocates an RAI/P-TMSI combination to a UE that supports only the 2G/3G access technology, allocates an SAE-TMSI to a UE that supports only the LTE access technology, and allocates an SAE-TMSI and an RAI/P-TMSI combination to a UE that supports the 2G/3G access technology and the LTE access technology.

According to the foregoing descriptions, when the UE accesses an MME through the SAE-TMSI, the objective of the invention may be achieved through at least the following steps: setting the NRI of the P-TMSI information in the RRC message as the MME-id; and setting the MME address information to the old RAI and/or P-TMSI of the NAS message so that other information may occupy the old RAI, and/or P-TMSI, and/or P-TMSI Signature of the NAS message. It should be noted that the settings may not be sequential settings or unique settings. For example, certain bits of the Pool-id can be set to the old RAI and certain bits of the Pool-id can be set to the P-TMSI. In addition, the MME-id may be set both in the old RAI and in the NRI, and the information in the two positions can be the same or duplicate.

In the foregoing embodiments of the invention, when the MME information for uniquely identifying an MME is added to the access message sent to the old network, the old network can determine and find the MME that is accessed by the UE in the evolved network without changing the RNC and the SGSN on the old network. Each network node that communicates with the UE, such as an MME and an SGSN, may be described as the network.

An embodiment of the invention also proposes a method for providing a Temporary Logical Link Identity (TLLI) when a UE accesses a 2G network: The network receives an access message sent by the UE. The access message contains two TLLIs, namely, the first TLLI and the second TLLI. When the first TLLI information carries the TMSI information (if the RAT adopted for the last access is 2G/3G, the TLLI is formed by removing the first two bits of the P-TMSI; if the RAT adopted for the last access is SAE, the TLLI is formed by removing the first two bits of the M-TMSI) of the RAT of the network that is accessed by the UE at the last time, the RAT is called the first RAT.

When the second TLLI information carries the TMSI information (if the RAT adopted by the current access is 2G/3G, the TLLI is formed by removing the first two bits of the P-TMSI; if the RAT adopted by the current access is SAE, the TLLI is formed by removing the first two bits of the M-TMSI) of the RAT of the network that is accessed by the UE currently, the RAT is called the second RAT. If the two RATs are the same, the UE may carry only the information of one TLLI. If the RAT adopted for the last access is SAE, the old RAI in an NAS message sent by the UE may also be mapped by other information of the SAE-TMSI except the M-TMSI. In addition, the NAS message sent by the UE further carries the old RAI of the RAT or the remaining information of the SAE-TMSI except the M-TMSI. When the two RATs are the same, the NAS message sent by the UE may not carry the old RAI of the RAT or the remaining information of the SAE-TMSI except the M-TMSI.

For example, when the UE moves from an MME of an evolved network to a 2G network, the first TLLI is formed by removing the first two bits of an M-TMSI and is placed at the normal TLLI position, and the second TLLI is formed by removing the first two bits of a P-TMSI on the 2G network and is placed at a new position (The usage is different from the usage in Release 7). Other information of the SAE-TMSI except the M-TMSI carried in the NAS message sent by the UE is mapped to the normal old RAI position and the old RAI information of the 2G network carried in the NAS message is placed at a new position.

When the UE moves from a 2G network to another 2G network, or when the latest context of the UE is on the 2G network, the first TLLI is formed by removing the first two bits of a P-TMSI and is placed at the normal TLLI position, and the second TLLI is formed by removing the first two bits of the P-TMSI and is placed at a new position (The usage is different from the usage in Release 7). The UE may also carry only one TLLI.

If an RAN node is connected to a 2G CN of a later version (such as Release 8), the RAN node may use the second TLLI to select a CN node. If only one TLLI is available, the RAN node selects a CN node according to the TLLI. If an RAN node is connected to a 2G CN of an earlier version (such as Release 7 or earlier versions), the RAN node selects a CN node according to the first TLLI.

The following paragraphs provide details.

When a UE accesses an SGSN of a network earlier than 3GPP R8 (Pre-R8), the UE may carry the ID allocated for the RAT adopted for the last access, in the TLLI. For example, the ID allocated for the RAT of a 2G/3G network that is last accessed by the UE is a P-TMSI. When the UE accesses an SGSN of Pre-R8, the UE removes the first two bits of a P-TMSI and places the P-TMSI to the TLLI. According to the received TLLI, the SGSN generate a P-TMSI of the NAS. For example, the SGSN adds two bits whose values are 1 before the TLLI.

If the last accessed MME of the UE is on an evolved network, the UE may remove the first two bits of the M-TMSI in the SAE-TMSI that is allocated to the UE by the MME and places the M-TMSI to the TLLI, and places other bits in the SAE-TMSI to the old RAI.

When the UE accesses a 2G network, the UE provides the information of two TLLIs if the UE has two TMSIs. The first TLLI carries the latest TMSI information of the UE, such as the TMSI information used when the UE accesses the network at the last time. The second TLLI carries the TMSI information that supports the same RAT when the UE accesses the network currently. If the UE finds that the two TMSIs are the same, the UE provides the information of only one TMSI. When an RAN node is connected to a new system, such as an SGSN of 3GPP R8, the access node selects a CN node according to only the second TLLI carrying the TMSI information that supports the same RAT when the UE accesses the network currently. If only one TLLI is available, the access node selects a CN node according to the TLLI. If the RAN node is connected to an old system, such as an SGSN of Pre-R8, the RAN node selects a CN node according to the first TLLI. With the embodiment, the RAN node can select a proper CN node according to the feature of the connected CN node. Thus, the old CN node can obtain the latest context information without being upgraded.

Through the foregoing descriptions, it is understandable to those skilled in the art that the embodiments of the invention may be implemented through software and a general hardware platform or through hardware only. In accordance with such understanding, the technical solution of the invention or contributions to the prior art can be embodied by software products. The software products are stored in a storage medium and incorporate several instructions to instruct a computer device, for example, a personal computer, a server, or a network device, to execute the steps provided by each embodiment of the invention.

Although the invention has been described through above embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for accessing a legacy wireless network, the method comprising:
   receiving, by a radio access network (RAN) node in the legacy wireless network, an access message sent by a User Equipment (UE) attempting to access the legacy wireless network, the access message comprising mobility management entity (MME) information identifying an MME accessed by the UE in an evolved network, the MME information being added by the UE from a temporary identity (ID) allocated by the MME to a first P-Temporary Mobile Station Identity (P-TMSI) in the access message; and
   selecting, by the RAN node, a corresponding Serving GPRS Support Node (SGSN) in the legacy wireless network for the UE according to the first P-TMSI in the access message.

2. The method of claim 1, wherein the MME information comprises an MME-Identity (MME-id) and wherein a Network Resource Identifier (NRI) of the first P-TMSI in the access message is set as the MME-id.

3. The method of claim 2, wherein selecting the corresponding SGSN comprises selecting the SGSN in the legacy wireless network whose NRI matches the NRI of the first P-TMSI in the access message.

4. The method of claim 3, wherein the SGSN is a combined MME/SGSN and wherein an NRI of the combined MME/SGSN is set at a value that is identical to the MME-id of the combined MME/SGSN.

5. The method of claim 1, wherein the MME information from the temporary ID is further added to a Non Access Stratum (NAS) message carried in the access message.

6. The method of claim 5, further comprising forwarding the NAS message from the RAN node to the selected SGSN to enable the SGSN to determine the MME according to the MME information added to the NAS message and to request the UE information from the MME.

7. The method of claim 6, wherein the MME information is added to a second P-TMSI and a Routing Area Identity (RAI) of the NAS message.

8. The method of claim 7, wherein the MME information comprises any one of:
   an MME-id;
   the MME-id and a Pool-id of the MME; and
   the MME-id, the Pool-id of the MME and a PLMN-id of the MME.

9. The method of claim 7, wherein the MME information comprises a PLMN-id of the MME, a Pool-id of the MME and an MME-id, wherein a NRI of the second P-TMSI is set as the MME-id and wherein the PLMN-id and the Pool-id are added to the RAI.

10. The method of claim 7, wherein the information of the temporary ID other than the MME information is added to any one or combination of the second P-TMSI, the RAI or a P-TMSI Signature in the NAS message.

11. The method of claim 1, wherein the access message is a Radio Resource Control (RRC) message.

12. A communication system, comprising:
   a mobility management entity (MME) in an evolved network, configured to allocate a temporary identity (ID) to a User Equipment (UE), the temporary ID comprising MME information identifying the MME; and
   a radio access network (RAN) node in a legacy wireless network, configured to receive an access message sent by the UE attempting to access the legacy wireless network, the access message comprising the MME information, the MME information being added by the UE from the temporary ID to a first P-Temporary Mobile Station Identity (P-TMSI) in the access message, the RAN node further configured to select a corresponding Serving GPRS Support Node (SGSN) in the legacy wireless network for the UE according to the first P-TMSI in the access message.

13. The system of claim 12, wherein the MME information comprises an MME-Identity (MME-id) and wherein the Network Resource Identifier (NRI) of the first P-TMSI in the access message is set as the MME-id.

14. The system of claim 13, wherein the RAN node is configured to select the SGSN in the legacy wireless network, whose NRI matches the NRI of the first P-TMSI in the access message.

15. The system of claim 14, wherein the SGSN is a combined MME/SGSN and wherein an NRI of the combined MME/SGSN is set at a value that is identical to the MME-id of the combined MME/SGSN.

16. The system of claim 12, wherein the MME information from the temporary ID is further added to a Non Access Stratum (NAS) message carried in the access message and wherein the RAN node is further configured to forward the NAS message to the selected SGSN.

17. The system of claim 16, wherein the NAS message enables the selected SGSN to determine the MME according to the MME information added to the NAS message and to request the UE information from the MME.

18. A non-transitory computer readable medium storing computer executable instructions that when executed in a User Equipment (UE) attempting to access a legacy wireless network perform the steps of:
  obtaining a temporary identity (ID) allocated by a Mobility Management Entity (MME) in an evolved network, wherein the temporary ID comprises MME information for identifying the MME;
  adding the MME information from the temporary ID to a first P-Temporary Mobile Station Identity (P-TMSI) in an access message; and
  sending the access message to a Radio Access Network (RAN) node in the legacy wireless network.

19. The non-transitory computer readable medium of claim 18, wherein the MME information comprises an MME-Identity (MME-id) and wherein adding the MME information from the temporary ID to the first P-TMSI in the access message comprises setting the Network Resource Identifier (NRI) of the first P-TMSI in the access message as the MME-id.

20. The non-transitory computer readable medium of claim 19, wherein the access message enables the RAN node to select a Serving GPRS Support Node (SGSN) in the legacy wireless network whose NRI matches with the NRI of the first P-TMSI in the access message.

* * * * *